(12) United States Patent
Röhm

(10) Patent No.: US 7,503,565 B2
(45) Date of Patent: Mar. 17, 2009

(54) LOCKABLE DRILL CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 32 days.

(21) Appl. No.: 11/131,475

(22) Filed: May 17, 2005

(65) Prior Publication Data

US 2006/0208435 A1  Sep. 21, 2006

Related U.S. Application Data

(63) Continuation-in-part of application No. PCT/DE2005/000517, filed on Mar. 19, 2005.

(51) Int. Cl.
*B23B 31/16* (2006.01)
*B23B 31/38* (2006.01)

(52) U.S. Cl. .......................... 279/60; 279/140

(58) Field of Classification Search .................. 279/60, 279/140, 61, 62, 63, 53, 56, 58
See application file for complete search history.

(56) References Cited

U.S. PATENT DOCUMENTS

| 3,970,323 | A | * | 7/1976 | Schnizler, Jr. ................ 279/64 |
| 4,213,623 | A | * | 7/1980 | Rohm ........................ 279/140 |
| 4,230,327 | A | * | 10/1980 | Rohm ........................ 279/61 |
| 4,272,087 | A | * | 6/1981 | Rohm ........................ 279/62 |
| 4,302,021 | A | * | 11/1981 | Rohm ........................ 279/60 |
| 4,456,271 | A | * | 6/1984 | Kern et al. ................... 279/91 |
| 4,607,855 | A | * | 8/1986 | Rohm ........................ 279/62 |
| 5,031,925 | A | * | 7/1991 | Tatsu et al. .................. 279/64 |
| 5,054,796 | A | * | 10/1991 | Rohm ........................ 279/60 |
| 5,232,230 | A | * | 8/1993 | Lin ........................... 279/62 |
| 5,236,206 | A | * | 8/1993 | Rohm ........................ 279/63 |
| 5,407,215 | A | * | 4/1995 | Yang ......................... 279/64 |
| 5,435,578 | A | * | 7/1995 | Rohm ........................ 279/62 |
| 5,499,830 | A | * | 3/1996 | Schnizler .................... 279/62 |
| 2006/0284386 | A1 | * | 12/2006 | Mack ........................ 279/60 |
| 2007/0235951 | A1 | * | 10/2007 | Mack ........................ 279/60 |
| 2007/0273109 | A1 | * | 11/2007 | Mack et al. ................ 279/140 |
| 2008/0217869 | A1 | * | 9/2008 | Mack ........................ 279/62 |

FOREIGN PATENT DOCUMENTS

DE         3713457 C1 * 9/1988

* cited by examiner

*Primary Examiner*—David P Bryant
*Assistant Examiner*—Eric A Gates
(74) *Attorney, Agent, or Firm*—Andrew Wilford

(57) ABSTRACT

A drill chuck has a chuck body formed with an annular row of radially outwardly directed teeth. A sleeve axially fixed but rotatable about the chuck axis on the chuck body has a plurality of angularly spaced guides holding respective radially displaceable jaws. A screwthread displaces the jaws radially toward each other on rotation of the sleeve in a tightening direction on the body and displaces the jaws radially apart on rotation of the sleeve in an opposite loosening direction. A pawl pivoted on the inner sleeve has a tip radially displaceable between an inner blocking position engaging the body teeth and allowing rotation of the sleeve on the body only in the tightening direction and an outer freeing position clear of the body teeth and permitting rotation of the sleeve on the body in both of the directions. A spring urges the pawl into the inner blocking position.

14 Claims, 2 Drawing Sheets

LOCKABLE DRILL CHUCK

CROSS REFERENCE TO RELATED APPLICATION

This application is a continuation in part of PCT application PCT/DE2005/000517 filed 19 Mar. 2005.

FIELD OF THE INVENTION

The present invention relates to a chuck. More particularly this invention concerns a lockable drill chuck.

BACKGROUND OF THE INVENTION

A standard chuck as described in U.S. Pat. No. 4,302,021 has a chuck body formed centered on a chuck axis with an annular array of outwardly directed teeth. A plurality of generally angularly equispaced and radially displaceable jaws on the body can be displaced toward and away from each other by means of a tightening sleeve that is rotatable on the chuck body about the axis. A coupling ratchet pawl is pivoted on this sleeve and has an end engageable with the teeth so as only to allow rotation of the sleeve and chuck relative to each other so as to move the jaws toward one another, while preventing opposite rotation so that it acts like a one-way coupling. A spring is braced between this pawl and the sleeve and urges the pawl into radial engagement with the teeth. A release ring can be rotated relative to the chuck body between a torque-transmitting position allowing the spring to press the end of the pawl against the teeth and a releasing position holding the end of the pawl out of engagement with these teeth.

Such a chuck is self tightening in that, once it is clamped to a tool or workpiece and the coupling is set in the torque-transmitting position, its parts can only rotate in the tightening direction. Thus the chuck cannot loosen and any angular forces in the tightening direction will be effective only to further tighten it.

In this arrangement the tightening sleeve is formed with guides in which the jaws are axially and radially shiftable and in fact has two parts that are axially fixed to each other. The release ring is provided at the rear end of the chuck.

Such a chuck is operated to release or dechuck a tool or workpiece by rotating the release ring in one direction so as to retract the ratchet pawl, and then rotating the tightening sleeve in the opposite direction. Thus the user must normally grip the chuck with both hands, one on the release ring and one on the tightening sleeve, so as to oppositely rotate them, while taking care to subsequently only rotate the tightening sleeve while holding the release ring. To lock the chuck after rotating the tightening sleeve in one direction it is necessary to oppositely rotate the release ring, an operation that once again takes two hands and then the tightening operation similarly requires two hands.

Such operation of the chuck is relatively clumsy and is not in any way intuitive. A user not familiar with the chuck might not be able to use it at all, or is likely to leave it in the uncoupled condition in which there is no self-tightening action. Furthermore the chuck must be made axially long to allow the user to get a good grip on the two oppositely rotated parts, with the result that the tool incorporating this chuck is excessively long and top heavy.

OBJECTS OF THE INVENTION

It is therefore an object of the present invention to provide an improved self-tightening chuck.

Another object is the provision of such an improved self-tightening chuck that overcomes the above-given disadvantages, in particular that is of very compact construction and that can easily be operated by one hand.

SUMMARY OF THE INVENTION

A drill chuck has according to the invention a chuck body centered on and rotatable about a chuck axis and formed with an annular row of radially outwardly directed teeth. A sleeve axially fixed but rotatable about the axis on the chuck body is formed with a plurality of angularly spaced guides holding respective radially displaceable jaws. A screwthread displaces the jaws radially toward each other on rotation of the sleeve in a tightening direction on the body and displaces the jaws radially apart on rotation of the sleeve in an opposite loosening direction on the body. A pawl pivoted on the inner sleeve has a tip radially displaceable between an inner blocking position engaging the body teeth and allowing rotation of the sleeve on the body only in the tightening direction and an outer freeing position clear of the body teeth and permitting rotation of the sleeve on the body in both of the directions. A spring braced against the pawl urges the pawl into the inner blocking position. An actuating ring immediately axially adjacent the sleeve is rotatable about the axis between a pair of end positions. A cam inside the actuating ring is engageable with the pawl for shifting the pawl into the freeing position on rotation of the actuating ring in the loosening direction into one of the end positions and for shifting the pawl into the blocking position on rotation of the actuating ring in the tightening direction into the other of the end positions.

Thus with this system, the actuating ring for the one-way coupling is rotated in the tightening direction to set the chuck to allow tightening, and in the loosening direction to allow loosening. This greatly simplifies operation of the actuating ring and makes it, in fact, moderately intuitive. In addition it makes it possible to position the actuating ring and the tightening sleeve immediately adjacent each other. The sleeve includes an inner sleeve part formed with the guides and an externally exposed outer sleeve part fixed to and surrounding the inner part. In addition the outer sleeve part has a rear edge spaced immediately adjacent a front edge of the actuating ring. The outer sleeve part and the actuating ring are of substantially the same diameter at the adjacent front and rear edges. As a result the chuck can be made fairly short, but still offers the user enough surface to grip, since the actuating ring is also turned to tighten and loosen the chuck.

The pawl according to the invention is a lever having a central pivot, an inner arm engageable with the body teeth, and an outer arm engageable with the cam. The central pivot defines for the lever a pivot axis substantially parallel to the chuck axis, and the inner end is formed with a tooth complementary to the teeth of the body. The outer arm of the lever is radially captured and wedged between the ring and the sleeve in the one end position and is longer than the inner arm. As a result the coupling latches in the open position and takes a little extra force to move out of this position. The spring is braced generally tangentially between the sleeve and the lever outer arm. The lever outer arm forms a seat for an end of the spring and has a radially outwardly convex outer face. This rounded outer face ensures smooth actuation of the pawl as the actuating ring is twisted.

Furthermore according to the invention formations on the sleeve and ring limit rotation of the ring on the sleeve to angular movement between the end positions. The formations are radially directed and formed on an inner surface of the ring and a confronting outer surface of the sleeve.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
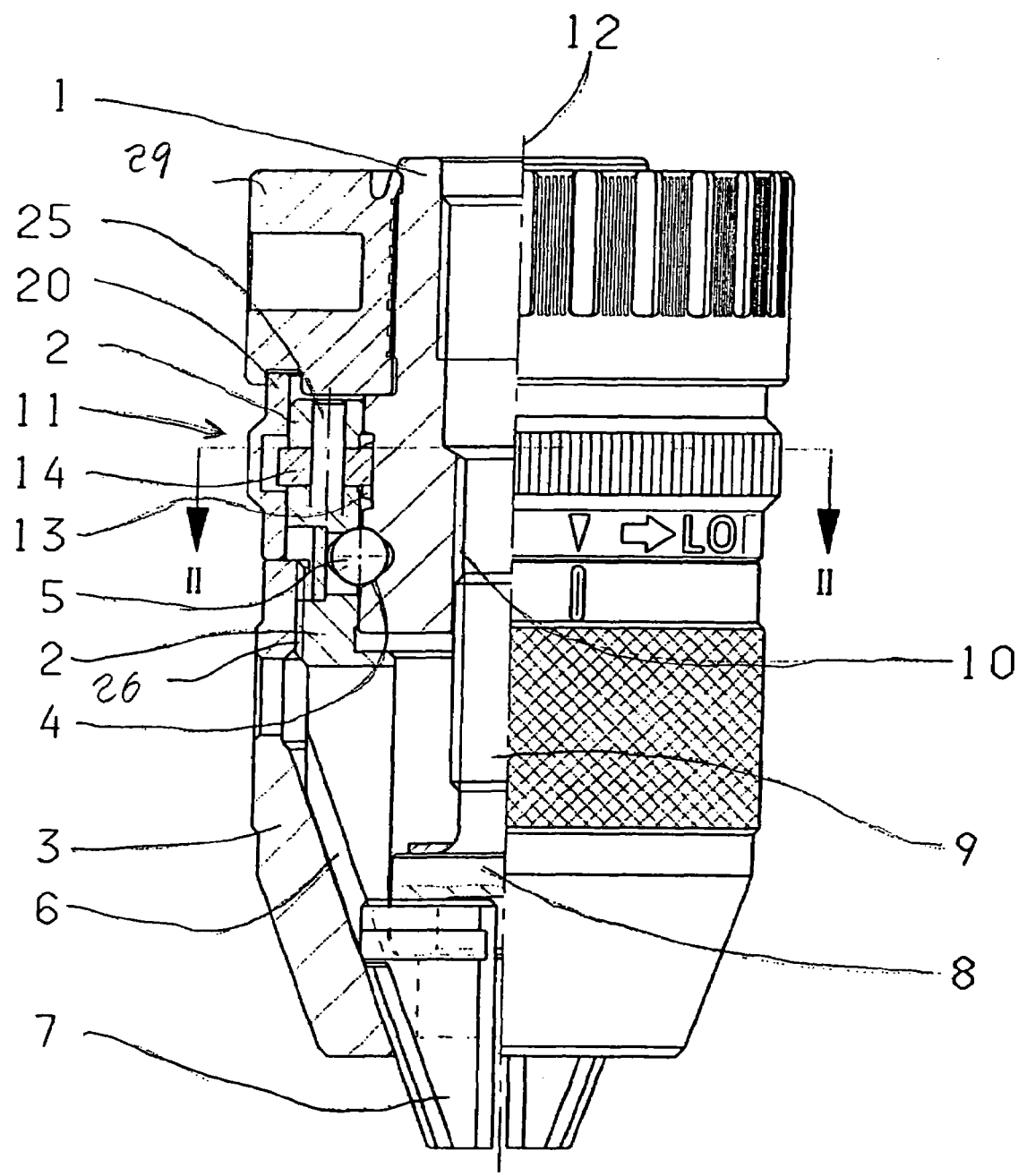
FIG. 1 is a side view partly in axial section through the chuck according to the invention.

As seen in the drawing, a chuck according to the invention has a chuck body 1 centered on and rotatable by an unillustrated power unit about an axis 12. An inner sleeve 2 surrounds the body 1 and is rotatable thereon about the axis 12, and an externally milled outer sleeve 3 is fitted over and rotationally fixed by splines 26 to the inner sleeve 2. Balls 5 riding in a groove 4 of the body 1 axially couple the inner sleeve 2 to the body 1 while still allowing them to rotate relative to each other. This inner sleeve 2 is formed with three angularly equispaced guides 6 in which respective jaws 7 are axially and radially shiftable. A pusher body 8 has a stem 9 threaded into a threaded central bore 10 of the body 1 and is rotationally coupled to the jaws 7 and through them to the inner sleeve 2 so that rotating the sleeves 2 and 3 in a tightening direction 27 relative to the body 1 will move the jaws 7 axially outward (down in the drawing) and radially together to grip and hold an unillustrated tool or workpiece while opposite rotation of the inner sleeve 2 in a loosening direction 28 will retract and spread them to dechuck the tool or workpiece. The rear end of the body 1 carries a threaded-on back ring 29 that is axially and rotationally fixed in place.

Figure 2:
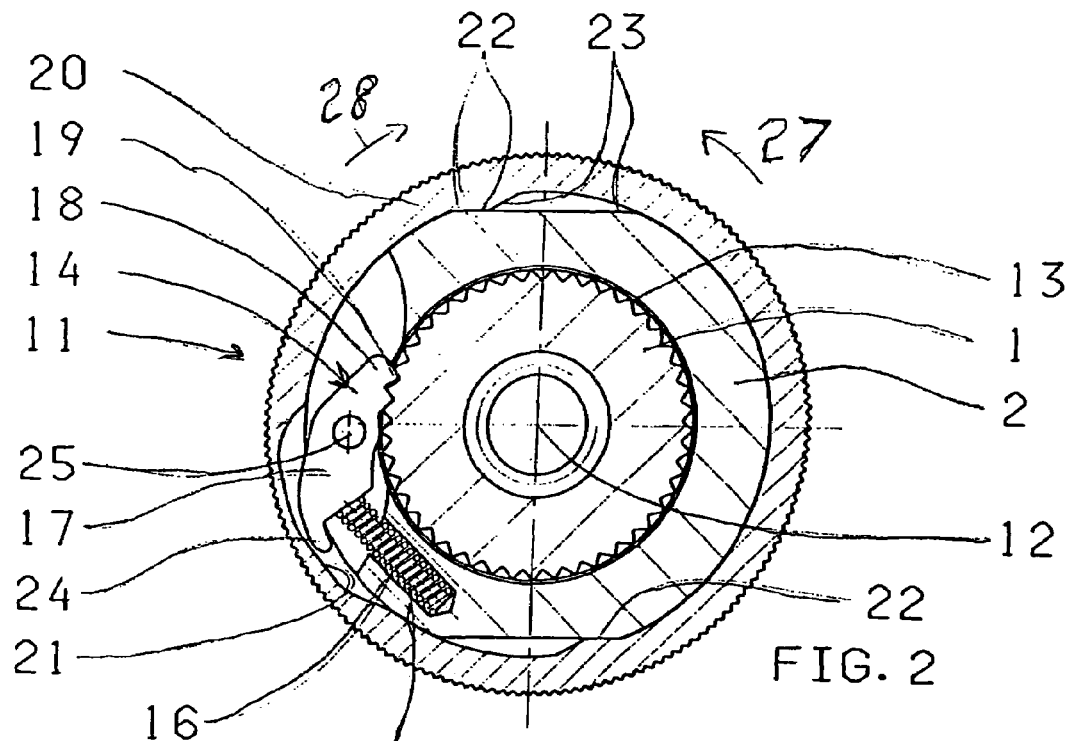
FIG. 2 is a cross section through the chuck along line II-II of FIG. 1 with the chuck in the locked condition.
Figure 3:
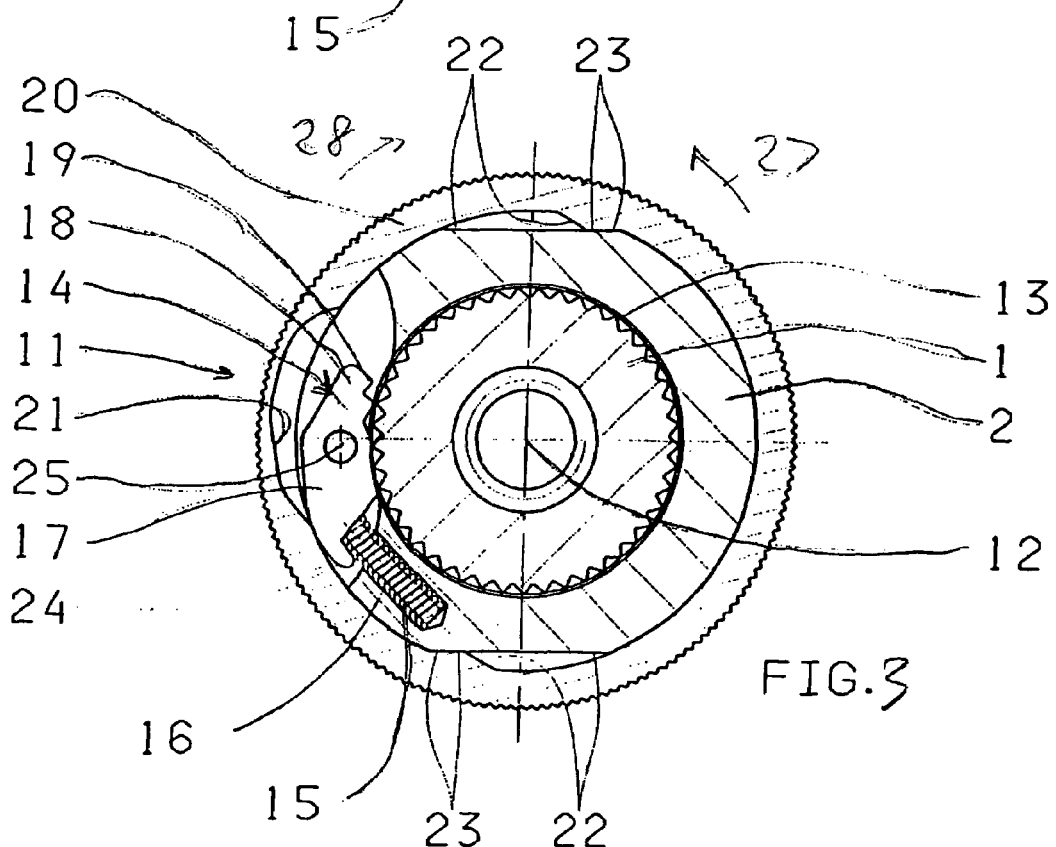
FIG. 3 is a view like FIG. 2 but with the chuck in the unlocked condition.

According to the invention a coupling 11 is provided that can block rotation of the body 1 in the sleeves 2 and 3 in the loosening direction 28 but that allows opposite rotation in the opposite tightening direction 27, for self-tightening action. This coupling 11 comprises a lever or pawl 14 pivoted centrally on the inner sleeve 2 on a pivot pin 25 extending parallel to the axis 12. The pawl 14 has an inner arm 18 formed with a tooth 19 engageable radially inward with a row of teeth 13 formed on the body 1 and an outer arm 17 with a narrow angularly extending end 24. A spring 15 set in a secantally or tangentially extending bore 16 of the inner sleeve 2 bears on the outer arm 17 and pivots the pawl 14 clockwise as shown in FIGS. 2 and 3 about the pivot 25 to push the tooth 19 of its inner arm 18 radially inward toward the teeth 13 of the body 1, into the coupled position. The narrow end 24 of the outer arm 17 of the pawl 14 reaches over the spring 15 to keep it from slipping out of place. The angles of the flanks of the tooth 19 and the teeth 13 are such that, if the sleeves 2 and 3 try to rotate in the loosening direction 28 while the tooth 19 is engaged between the teeth 13, such rotation will be absolutely blocked, but opposite rotation of the sleeves 2 and 3 in the tightening direction 27 takes place with ratcheting of the pawl tooth 19 in the body teeth 13, that is with the pawl tooth 19 slipping over the body teeth 13.

An actuating ring or sleeve 20 rotatable limitedly about the axis 12 level with the pawl 14 has an internal cam 21 engageable with the outer arm 17 of the pawl 14. It has a front edge lying in a plane perpendicular to the axis 12 against a similarly planar rear edge of the outer sleeve 3, and is at the joint of the same diameter. Centrally the ring 20 is formed with a radially outwardly raised trapezoidal-section milled ridge that provides a good grip.

The ring 20 and chuck body 1 are also formed with angularly interengageable flat formations 22 and 23 that limit angular movement of the ring 20 on the inner sleeve 2, the flats 22 coming into engagement with each other in the coupled position of FIG. 2 and the flats 23 engaging each other in the uncoupled or freeing position of FIG. 3, so that the ring 20 can only move angularly relative to the sleeves 2 and 3 through a small acute angle of less than 45°.

This system is operated as follows:

Assuming the chuck is in the position of FIGS. 1 and 2, that is with the coupling 11 in the torque-transmitting position and the jaws 7 in a radially inner tool-holding position, rotation of the sleeves 2 and 3 in the loosening direction 28 is impossible since the tooth 19 is blocked against the teeth 13. If, however, the ring 20 is rotated from the FIG. 2 position in the loosening direction 28 into the FIG. 3 position, the cam 21 will engage the outer end 24 of the pawl 14 and pivot the tooth 19 out into the freeing position. In this position, the sleeves 2 and 3 can rotate freely in both directions relative to the body 1, allowing the chuck to be opened.

From the open position of FIG. 3, rotation of the actuating ring 20 in the tightening direction 27 will allow the spring 15 to push the pawl tooth 19 back into engagement with the teeth, reestablishing the torque-transmitting condition of the coupling 11. If the sleeves 2 and 3 are then also rotated in the tightening direction 27, the pawl 14 will simply ratchet along the row of teeth.

The actuating ring 20 and tightening sleeve 3 have generally flush outer surfaces so that they can be actuated together, and in fact the ring 20 is carried on the outer sleeve 3 so that it is rotationally entrained thereby. Thus if the user grips both the ring 20 and sleeve 3 with his or her hand and turns them to open the chuck, the ring 20 will be able to move limitedly, whereupon the sleeve 3 will be able to turn. Opposite rotation of both the ring 20 and sleeve 3 will allow the tooth 19 to engage the teeth 13, but as described above will not inhibit tightening rotation of the sleeve 3 on the body 1.

I claim:

1. A drill chuck comprising:
   a chuck body centered on and rotatable about a chuck axis and formed with an annular row of radially outwardly directed teeth;
   a sleeve axially fixed but rotatable about the axis on the chuck body and formed with a plurality of angularly spaced guides;
   respective jaws radially displaceable in the guides;
   means including a screwthread formation for displacing the jaws radially toward each other on rotation of the sleeve in a tightening direction on the body and for displacing the jaws radially apart on rotation of the sleeve in an opposite loosening direction on the body;
   a pawl pivoted on the inner sleeve and having a tip radially displaceable between an inner blocking position engaging the body teeth and preventing rotation of the sleeve on the body in the loosening direction and an outer freeing position clear of the teeth and permitting such rotation, the teeth being angled and engaging the pawl in the blocking position so as to allow rotation of the sleeve on the body only in the tightening direction when in the inner blocking position while permitting rotation of the sleeve on the body in both of the directions in the outer freeing position;

spring means braced against the pawl and urging the pawl into the inner blocking position;

an actuating ring immediately axially adjacent the sleeve and rotatable on the body independently of the sleeve about the axis in the tightening direction and in the loosening direction between a pair of angularly offset end stop positions, the ring being in one of the end positions when rotated to a stop in the loosening direction and the other of the end positions when rotated to a stop in the tightening direction; and means including a cam inside the actuating ring and having a cam formation engageable with the pawl for shifting the pawl into the freeing position on rotation of the actuating ring in the loosening direction into the one of the end positions and for shifting the pawl into the blocking position on rotation of the actuating ring in the tightening direction into the other of the end positions.

2. The drill chuck defined in claim 1 wherein the sleeve includes an inner sleeve part formed with the guides and an externally exposed outer sleeve part fixed to and surrounding the inner part.

3. The drill chuck defined in claim 2 wherein the outer sleeve part has a rear edge spaced immediately adjacent a front edge of the actuating ring.

4. The drill chuck defined in claim 3 wherein the outer sleeve part and the actuating ring are of substantially the same diameter at the adjacent front and rear edges.

5. The drill chuck defined in claim 1 wherein the pawl is a lever having a central pivot, an inner arm engageable with the body teeth, and an outer arm engageable with the cam.

6. The drill chuck defined in claim 5 wherein the central pivot defines for the lever a pivot axis substantially parallel to the chuck axis.

7. The drill chuck defined in claim 5 wherein the inner arm is formed with a tooth complementary to the teeth of the body.

8. The drill chuck defined in claim 5 wherein the outer arm of the lever is radially captured between the ring and the sleeve in the one of the end positions.

9. The drill chuck defined in claim 5 wherein the outer arm is longer than the inner arm.

10. The drill chuck defined in claim 5 wherein the spring means includes a spring braced generally tangentially between the sleeve and the lever outer arm.

11. The drill chuck defined in claim 10 wherein the lever outer arm forms a seat for an end of the spring.

12. The drill chuck defined in claim 5 wherein the outer arm has a radially outwardly convex outer face.

13. The drill chuck defined in claim 1, further comprising means including formations on the sleeve and ring for limiting rotation of the ring on the sleeve to angular movement between the end positions.

14. The drill chuck defined in claim 13 wherein the formations are radially directed and formed on an inner surface of the ring and a confronting outer surface of the sleeve.

* * * * *